Feb. 14, 1939.  R. ROWNTREE ET AL  2,146,991
LOOM
Filed March 25, 1937   10 Sheets-Sheet 6
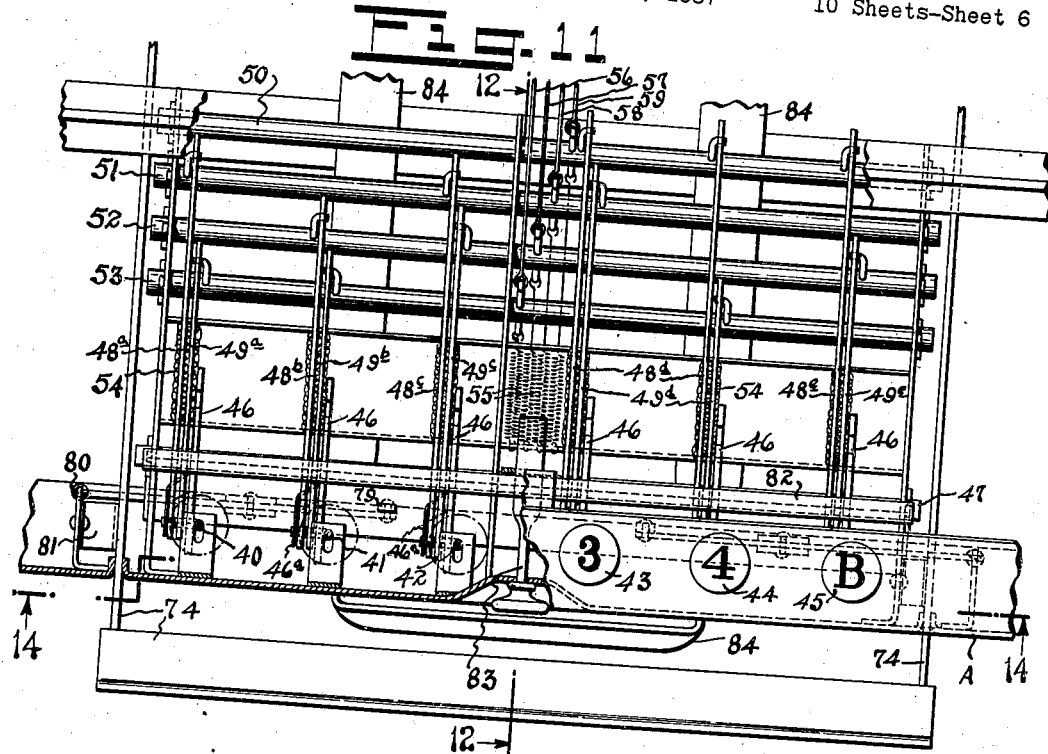
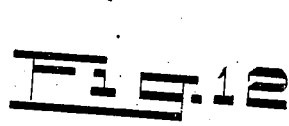
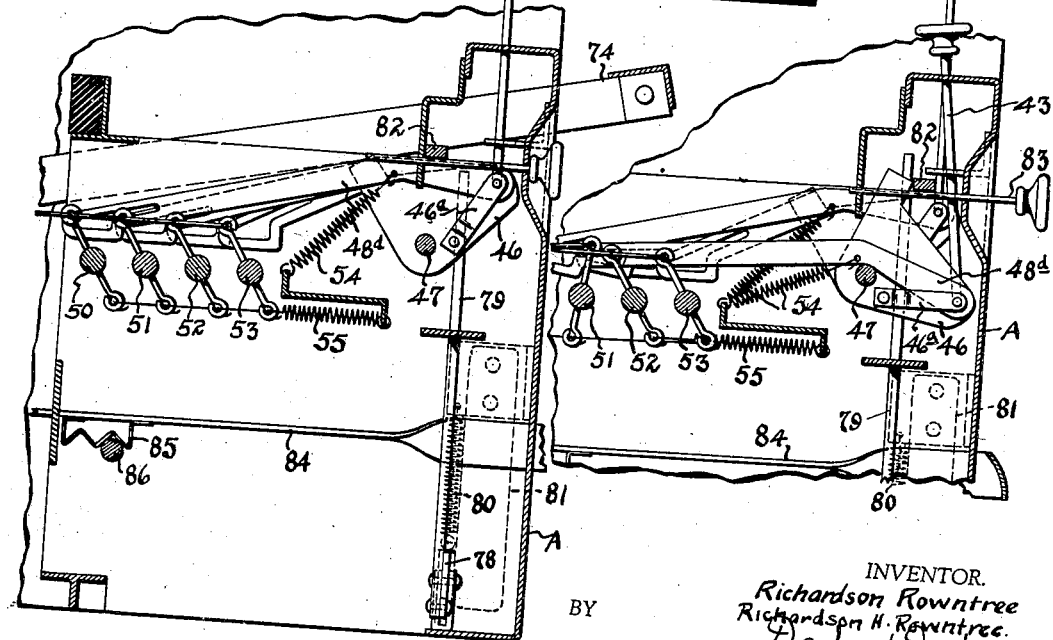
INVENTOR.
Richardson Rowntree
Richardson H. Rowntree.
BY
ATTORNEYS Feb. 14, 1939.  R. ROWNTREE ET AL  2,146,991
LOOM
Filed March 25, 1937    10 Sheets-Sheet 7

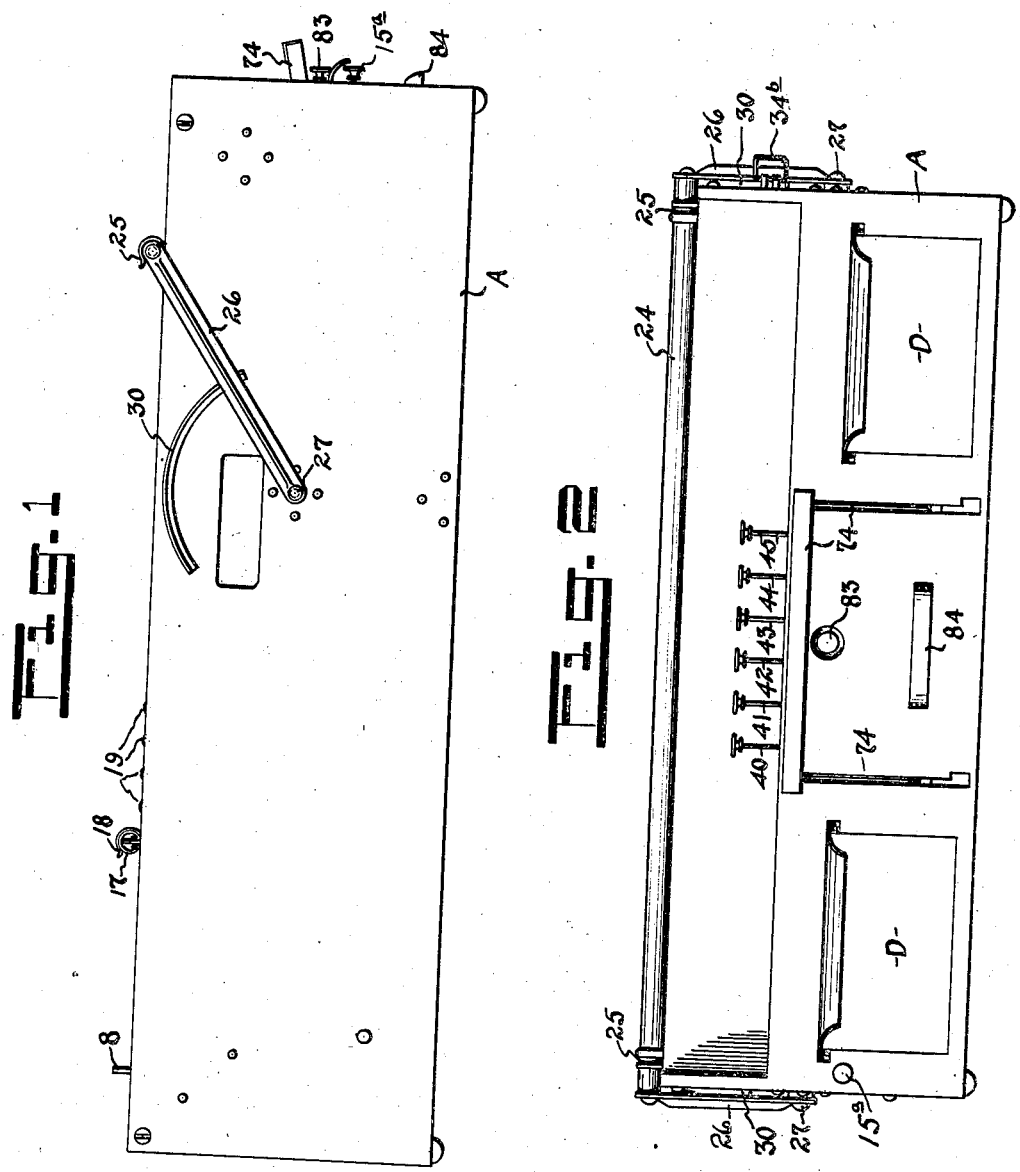

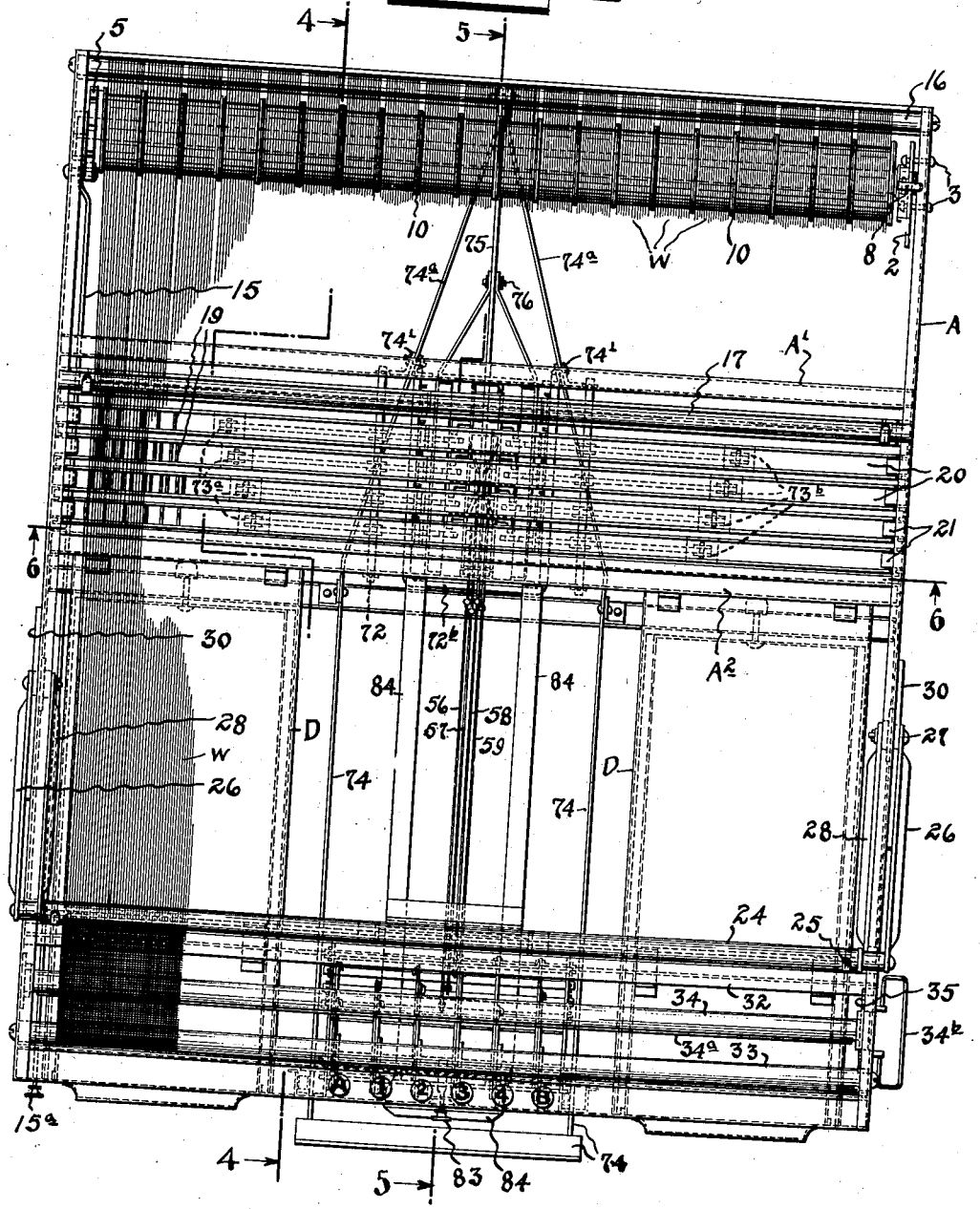

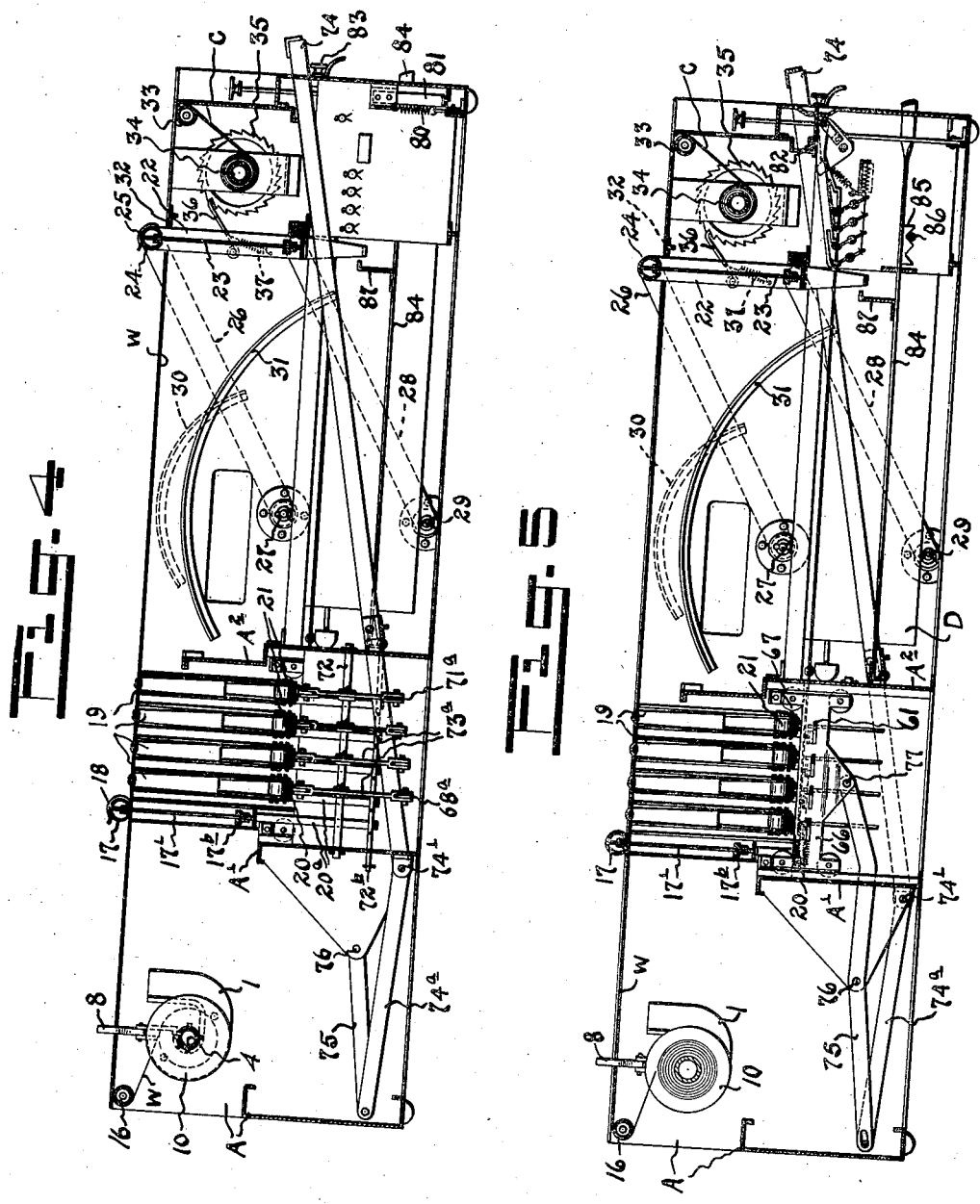

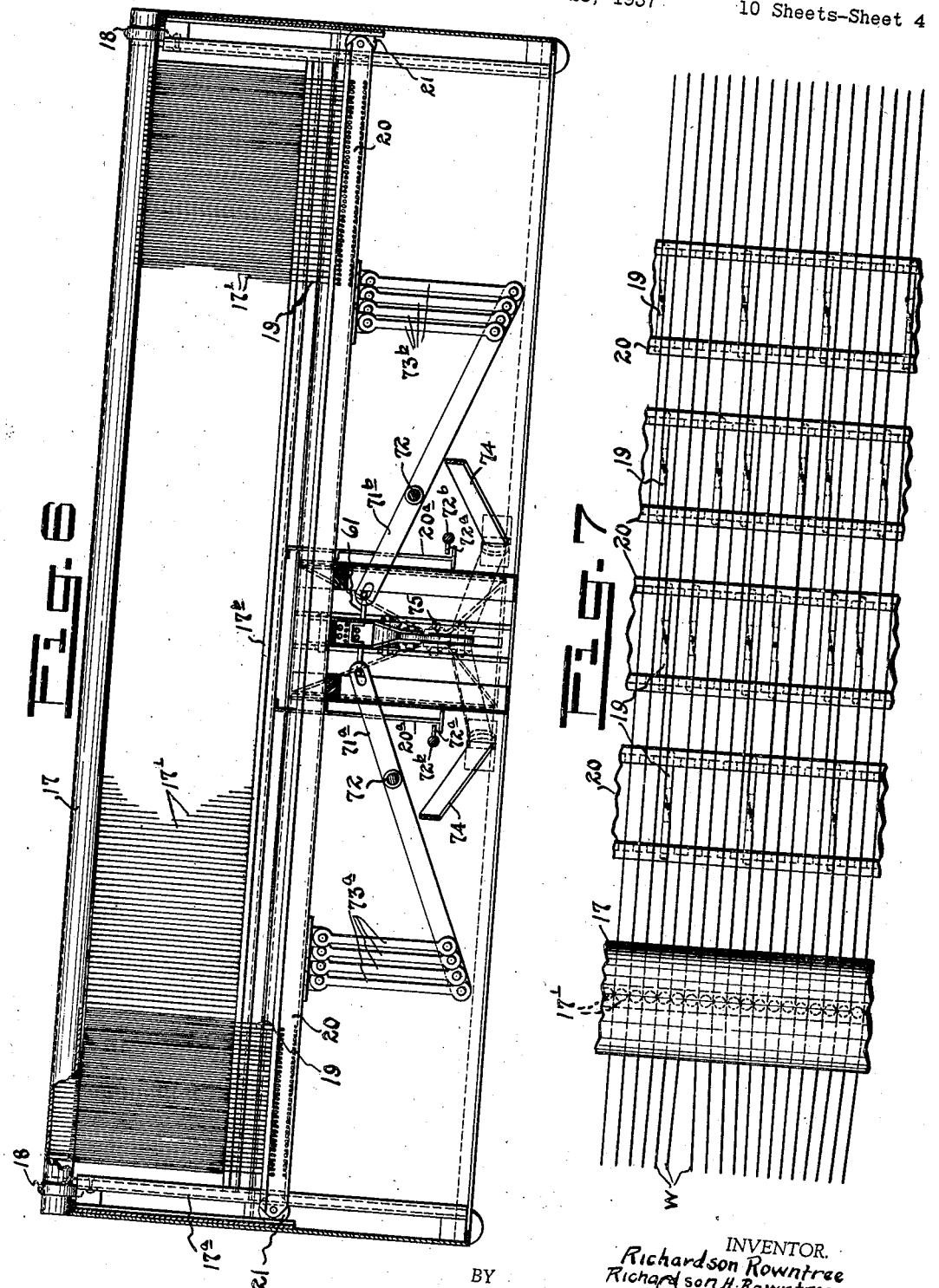

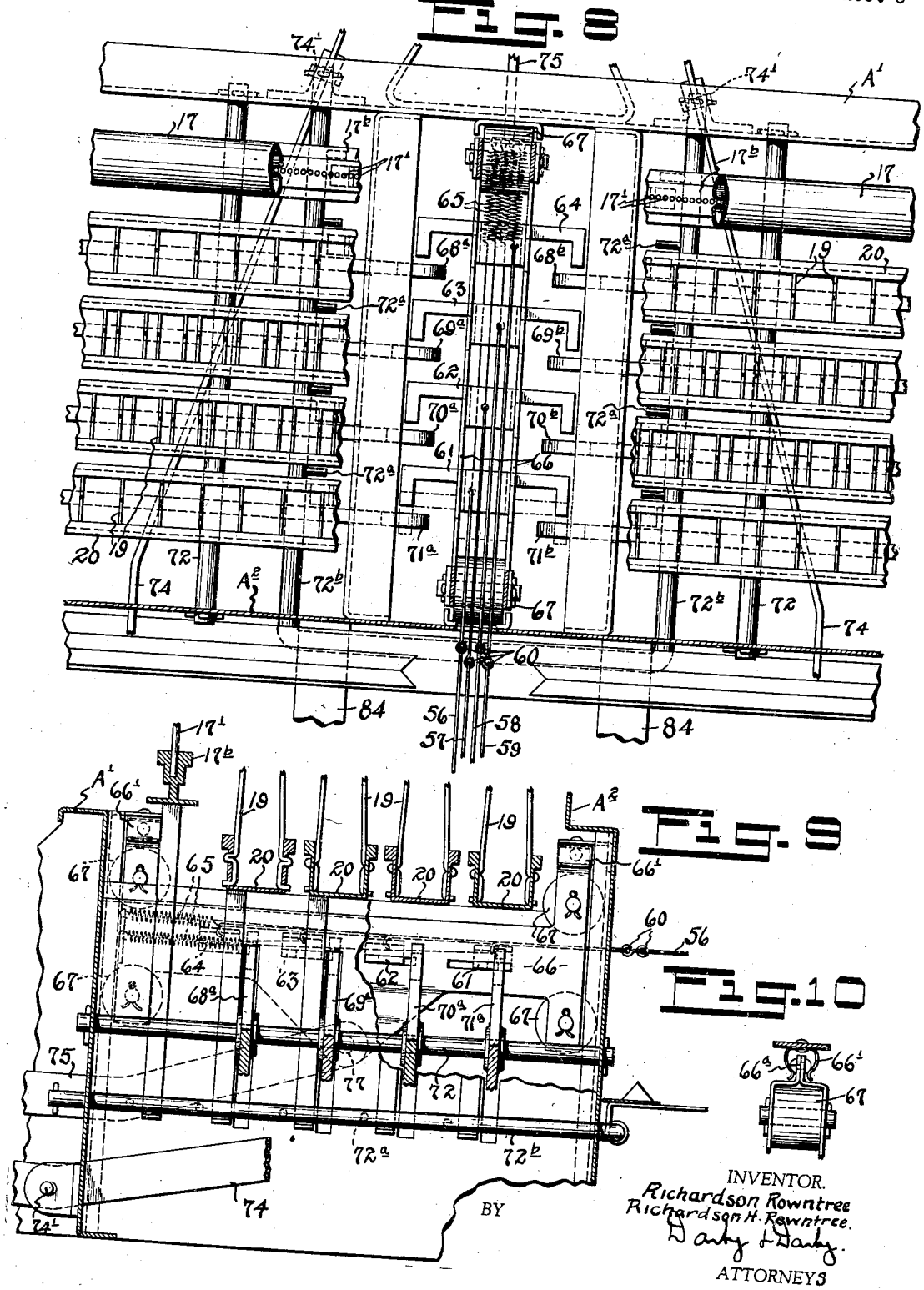

INVENTOR
Richardson Rowntree
BY Richardson H. Rowntree
Darby & Darby
ATTORNEYS

Feb. 14, 1939.  R. ROWNTREE ET AL  2,146,991
LOOM
Filed March 25, 1937   10 Sheets-Sheet 8
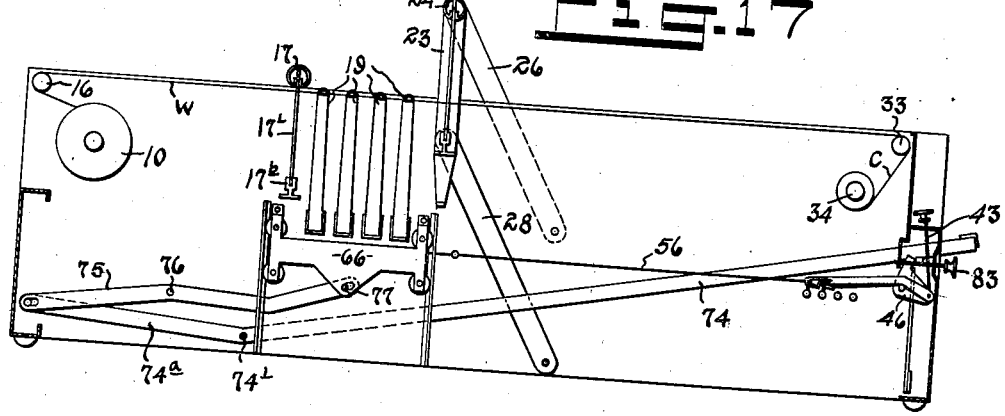
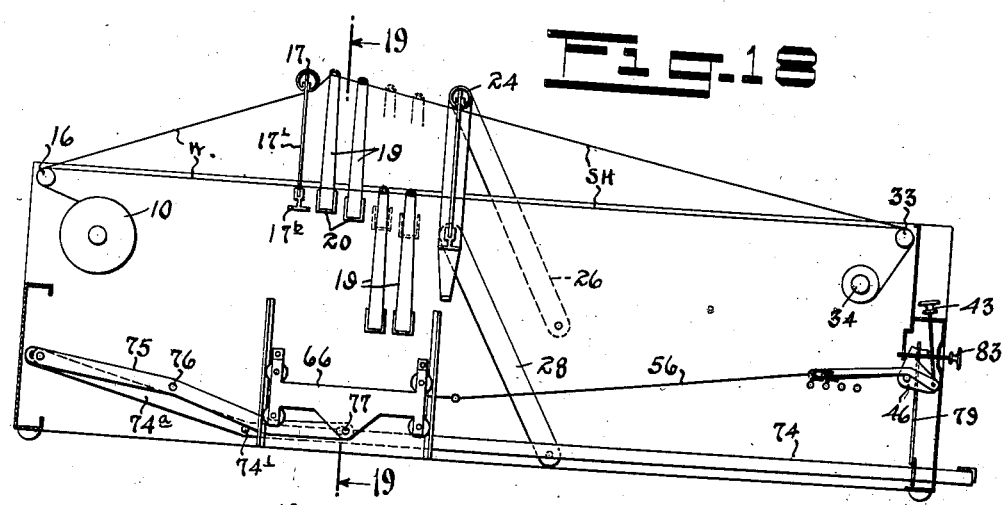
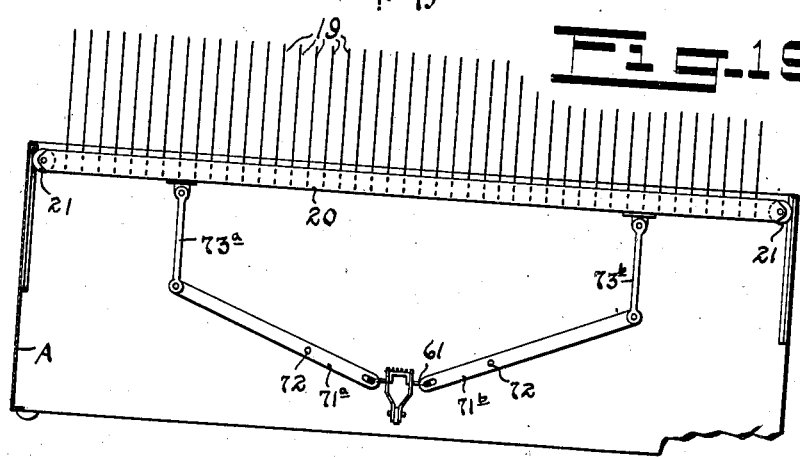
INVENTOR
Richardson Rowntree
Richardson H. Rowntree
BY
Darby & Darby
ATTORNEYS Feb. 14, 1939.  R. ROWNTREE ET AL  2,146,991
LOOM
Filed March 25, 1937    10 Sheets-Sheet 9
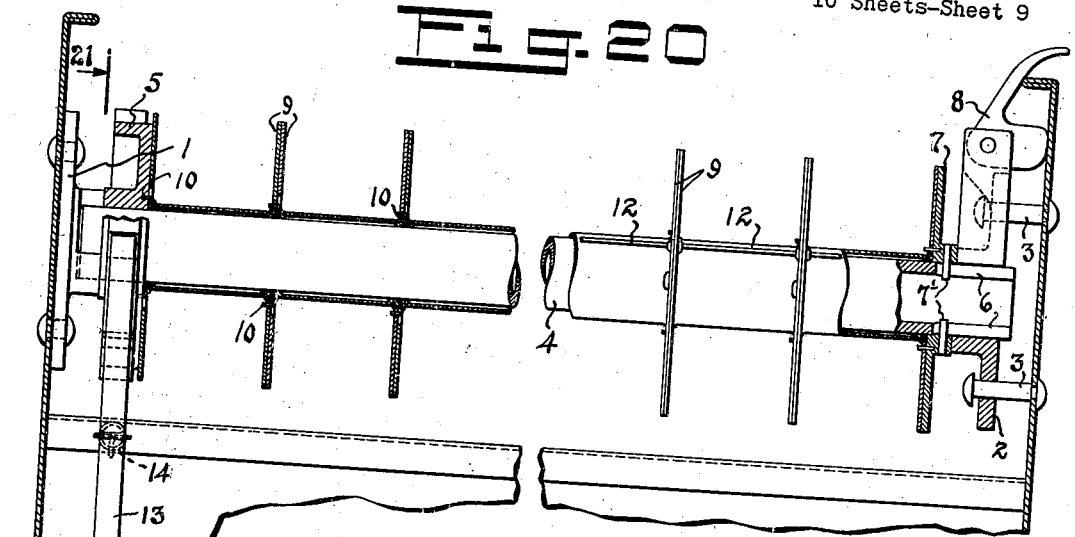
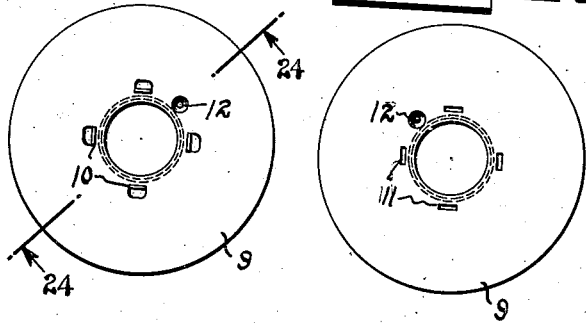
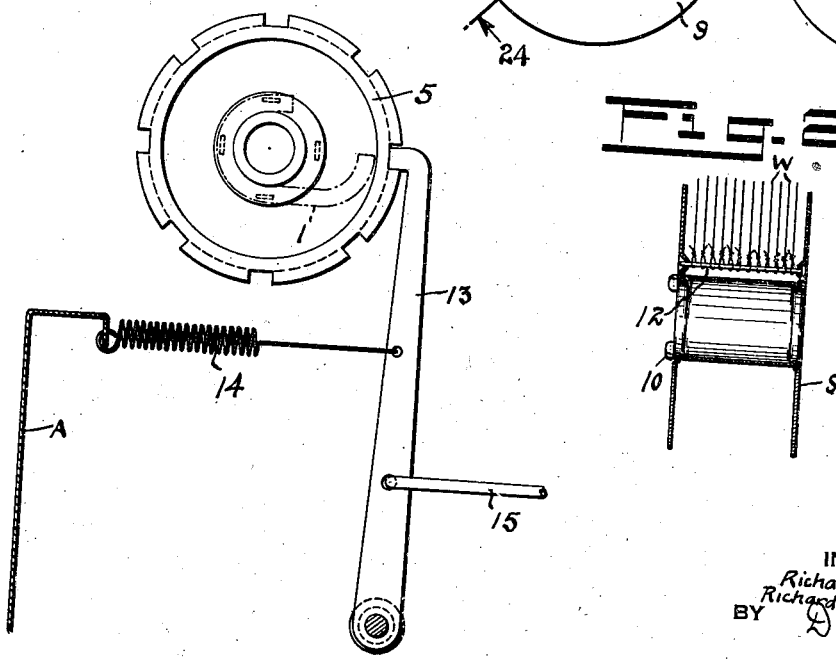
INVENTOR
Richardson Rowntree
Richardson H. Rowntree.
BY
ATTORNEYS

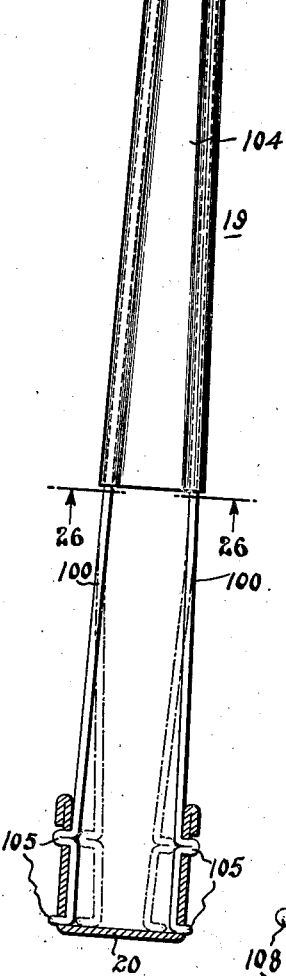

Patented Feb. 14, 1939

2,146,991

UNITED STATES PATENT OFFICE 2,146,991

LOOM

Richardson Rowntree, Seattle, Wash., and Richardson H. Rowntree, Columbus, Ohio; said Richardson H. Rowntree assignor to said Richardson Rowntree Application March 25, 1937, Serial No. 132,884

6 Claims. (Cl. 139—91)

This invention relates to improvements in complete loom constructions and parts thereof.

An important object of this invention is the provision of a portable, visible loom with a typewriter form of keyboard embodying mechanism whereby each individual harness may operate separately or in multiples.

A further object of this invention is to provide a relatively simple, compact loom structure of a portable type by means of which a wide variety of weaving may be accomplished by simple manipulation of the parts thereof.

A further object of this invention is to provide removable heddles for looms of this and more general types having open ended, slotted eyes.

A further object of this invention is to provide a reed for looms of this type having a detachable top and hinged dent-tines or vertical wires.

A further object of this invention is to provide a multiple harness loom in which the harness bars are moved from a retracted position in which they all lie in a horizontal plane, to a projected position in which they lie in an inclined plane, so as to hold the warp threads in a plane so as to form an unobstructed shed.

A further object of the invention is to provide a heddle construction such that the heddles may be individually removed from the harnesses.

A further object of this invention is to provide a reed construction for looms so arranged that the reed when moved travels vertically.

A further object of this invention is to provide a reed with a detachable top which when in place holds the dent-tines rigidly in place, but which when removed permits of inserting the warp thread between the dent-tines at their freed ends instead of threading them between the dent-tines.

Another object is to provide a reed having dent-tines pivotally mounted on their support.

These and many other more detailed objects which will be apparent from the following disclosure are successfully secured by means of this invention.

This invention resides substantially in the combination, construction, arrangement and relative location of parts, all as described in detail below.

In the accompanying drawings,

Figure 1 is a left-hand side elevational view of a portable loom in accordance with this invention;

Fig. 2 is a front elevational view thereof;

Fig. 3 is a top plan view of the loom;

Fig. 4 is a longitudinal, vertical, cross-sectional view through the loom on the line 4—4 of Fig. 3;

Fig. 5 is a similar view on the line 5—5 of Fig. 3;

Fig. 6 is a transverse, cross-sectional view on the line 6—6 of Fig. 3;

Fig. 7 is an enlarged plan view of a portion of the reed and harness bars;

Fig. 8 is an enlarged top plan view of a portion of the mechanism for operating the harness bars;

Fig. 9 is a cross-sectional view through this mechanism;

Fig. 10 is a detailed view of the latch mechanism for holding the carrier carriage in raised position as it is shown in Fig. 9;

Fig. 11 is a top plan view with some parts broken away of the key mechanism and the rollers for operating the carrier carriage;

Fig. 12 is a cross-sectional view taken on the line 12—12 of Fig. 11;

Fig. 13 is a portion of the same view showing the mechanism in operated position;

Fig. 17 is a somewhat diagrammatic view of the mechanism showing the harness bars, operating mechanism, and reeds with the harness bars in retracted position;

Fig. 18 is a similar view showing some of the harness bars projected to form the shed;

Fig. 19 is a somewhat diagrammatic view of the mechanism for projecting the harness bars;

Fig. 20 is an enlarged view of the warp thread spool supporting mechanism with some parts in cross-section;

Fig. 21 is the ratchet mechanism which controls the warp thread spools;

Figs. 22 and 23 are opposite side elevational views of the warp thread spool;

Fig. 24 is a cross-sectional view taken on the line 24—24 of Fig. 23;

Fig. 25 is a side elevational view of one form of heddle mounted in a harness bar;

Fig. 26 is a cross-sectional view taken on the line 26—26 of Fig. 25;

Figs. 27, 28 and 29 are elevational views of modified forms of heddles;

Fig. 30 is a front elevation of pivotally mounted dent-tines; and

Fig. 31 is a cross-sectional view.

Figure 14:
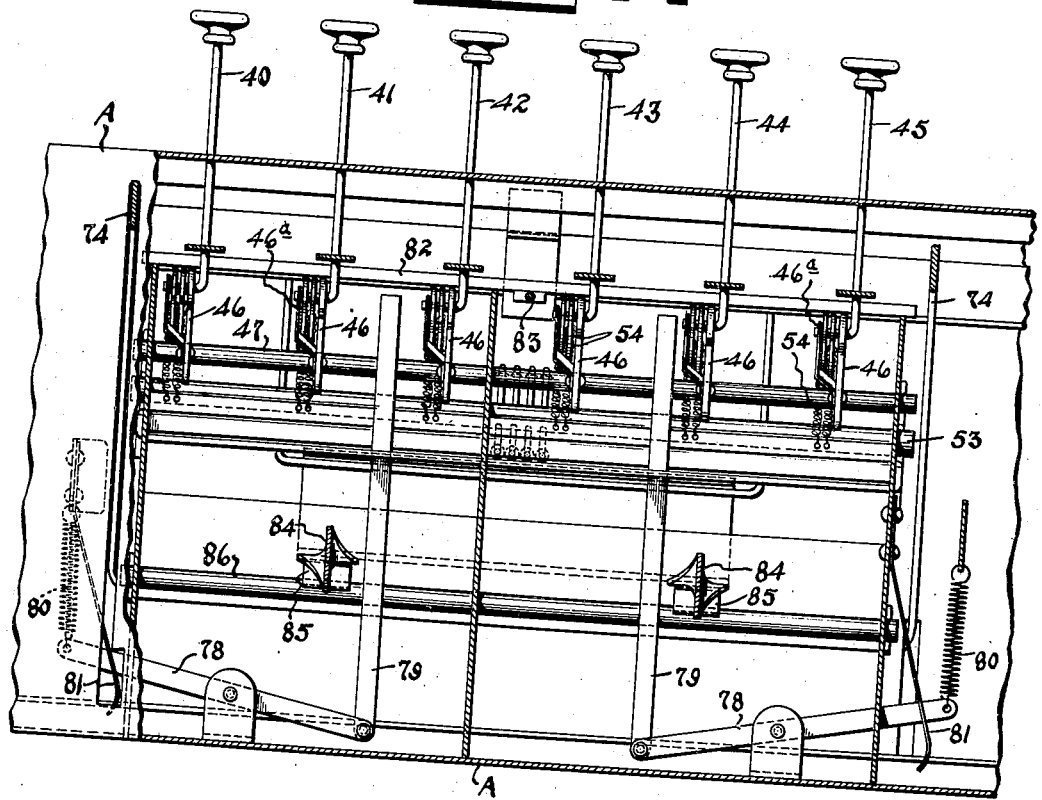
Fig. 14 is an enlarged front elevational view of a portion of the machine with most of the front wall broken away.

The particular form of loom shown in the drawings for the purpose of illustrating the features of this invention is of a light weight portable type employing four harnesses. It is to be understood, however, that many of the features of this invention are applicable to other and larger types of looms, as will be apparent from the following description in connection with these various parts.

In the drawings the loom is shown comprising a casing A, desirably constructed of thin sheet metal to form a rectangular shallow box on and within which all of the parts of the loom are mounted. At the rear end of the machine is a bearing member 1 (Fig. 20) secured to the side wall of the casing or housing A, and at 2 is a bearing member which is mounted on the housing for sliding movement by means of the pins 3. Rotatably journaled in these bearing members is a tubular shaft 4 which is provided at one end with a toothed ratchet 5 and which is slotted at the other end, as indicated at 6. Projecting into these slots are the pins 7' which are mounted upon a disc or collar 7 adjacent to the bearing member 2. A cam member 8 is pivotally mounted on the bearing member 2 and positioned to engage the side wall of the housing to force the bearing member 2 in an axial direction to lock the spools 9 on the shaft 4. These spools are provided with a series of struck-out ears 10 arranged on one side thereof to lock in complementary apertures 11 in the adjacent spools. As is clear from Fig. 20, the ears 10 of the left hand spool engage in notches in the ratchet 5, and pins on the collar 7 engage in the apertures on the right hand spool. When the spools are assembled on the shaft with the cam 8 in the position shown, it will be seen that all of the spools are locked together, to be rotated as a unit with the shaft 4. Mounted on each spool is a wire or rod 12 upon which the ends of the warp threads W are tied. When the spools are filled with threads they are placed on the shaft and locked together as a unit, as described. If desired the warp threads may be wrapped once or twice around the spool and locked in place by insertion of rod 12, in which case this rod is placed close enough to the spool case to grip the threads.

A pawl 13 pivotally mounted on the casing is held in engagement with the ratchet wheel 5 by a spring 14 and is released from the ratchet wheel by means of a rod 15 which extends to and through the front wall of the casing and terminates in an operating knob 15ᵃ.

As is clear from Figs. 3 and 4 for example, a guide rod or bar 16 is mounted between the side walls of the casing adjacent the reel mechanism, so that the warp threads are fed from the reels over this bar to and between the dent-tines 17' of a spacer. These dent-tines or wires are mounted at their lower ends upon a transverse bar 17ᵇ which is a part of the spacer framework. The upper ends of the dent-tines fit into a head piece 17 which is removable therefrom, but which is held thereon by means of clips 18. When the head piece 17, which is tubular as indicated in Figs. 4 and 6, for example, is removed the spaces between the dent-tines are open at their upper ends so that the warp threads may be placed between them. The head piece 17 is then placed back onto the dent-tines. This spacer framework, in which the dent-tines 17' are secured, is slidably mounted within the casing for vertical movement in guides. In use it is pulled up to the position shown in Fig. 18, and when not in use is retracted to the position shown in Figs. 4 and 5.

The harnesses comprise a series of vertically slidable frames having channel shaped harness bars 20, and provided at the ends, as is clear from Figs. 3, 4 and 6, with rollers 21 which operate in vertical guides secured to the inner faces of the side walls. Detachably mounted in the harness bars 20 are the heddles 19 which will be described in more detail later. These heddles are detachably mounted in the harness bars and are provided at their upper ends with centrally slotted eyes so that the warp threads may be placed therein and removed therefrom without removing the heddles from the harnesses. In other words, the warp threads can be sprung into or out of the slotted eyes, and do not, therefore, have to be threaded through the eyes in accordance with present day practice.

The forward reed consists of a framework 22 in which the dent-tines 23 are mounted. As before, a detachable top or head piece 24 is held on the upper ends of the dent-tines by means of the snap clips 25. The reed frame 22 is pivotally mounted on a pair of parallel levers 26 and 28 which are pivotally mounted on the side walls of the housing at 27 and 29 respectively. These levers are guided in their movement by the curved guides 30 and 31 on the outer and inner faces respectively of the side walls, and by this construction the reed frame and dent-tines travel vertically. In its forward position the reed frame lies against a transverse bar 32. At 33 is a guide bar or rod at the forward end of the machine extending between said walls in a manner similar to the rod 16 at the rear end, and around which the woven cloth C is guided to the cloth roll 34. This cloth roll consists of a shaft journaled on the side walls of the casing and provided with a removable clamping bar 34ᵃ by means of which the forward ends of the warp threads W are attached thereto. This shaft is provided with a handle 34ᵇ (Fig. 3) by means of which the cloth may be rolled up thereon, as it is woven. The shaft 34 is provided with a ratchet 35 cooperating with a pawl 36 held against the ratchet wheel by a spring 37. The parts are arranged as shown in Figs. 4 and 5, so that the shaft 34 may be rotated in a direction to roll the cloth thereupon.

Figure 15:
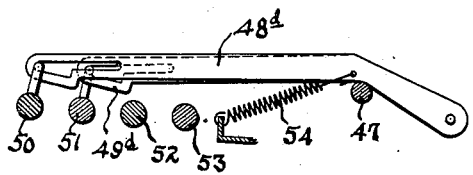
Figs. 15 and 16 are detailed views of a part of the roller operating mechanism.
Figure 16:
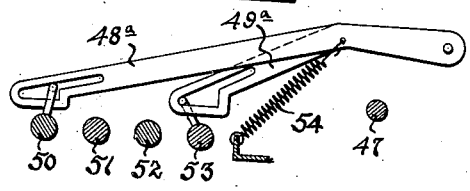

Mounted on the forward end of the machine are a series of vertically slidable keys 40, 41, 42, 43, 44 and 45, of which keys 40 and 45 are "tabby" keys. The casing is constructed to form a recess, as is clear from Figs. 4 and 5, in which these keys are mounted. They are pivotally connected at their lower ends to levers or segments 46, all of which are pivotally mounted upon a rod 47 secured on suitable supports within the casing or housing. Pivotally connected to each of these segments respectively, as is clear from Figs. 11, 12, and 14, are a pair of levers 48ᵃ, 49ᵃ; 48ᵇ, 49ᵇ; 48ᶜ, 49ᶜ; 48ᵈ, 49ᵈ; and 48ᵉ, 49ᵉ. The first two are pivotally connected to the rods or rollers 51 and 53; the next two are pivotally connected to the rollers 52 and 53; the next two to rollers 51 and 52; the next two to rollers 50 and 51; the next two to rollers 50 and 53; and the last two to rollers 50 and 52. The rollers 50, 51, 52 and 53 are pivotally mounted in brackets or supports within the housing, as is clear from Fig. 11. Each of the levers 48ᵃ, 49ᵃ, etc. are provided with springs 54 connected therebetween and a fixed part of the machine, as is clear from Figs. 14 and 15. The levers 48ᵃ and 49ᵃ, etc., are provided with slotted connections to the rollers, as is clear from Fig. 15, so that when the rollers are operated by one of the links connected thereto, it may have relative movement without moving them.

As is clear from Fig. 12, the rollers are provided with downward extensions near the center (see Fig. 11) which are connected by means of springs 55 to a fixed part of the machine whereby the rollers are normally held in the position shown in Fig. 12. At the same points the levers are provided with upward extensions which are connected to the wires 56, 57, 58 and 59. These wires extend towards the rear of the machine (see Fig. 8) where they are provided with eyeletted connections 60 to extensions thereof, which in turn terminate by connection to the slidable key members 61, 62, 63 and 64 respectively. Each of these key members is connected to a fixed part of the machine by means of springs 65 which hold them retracted to the full line position (Fig. 8). These keys are slidably mounted in the side walls of a carrier or carriage 66, which is provided with four guide rollers 67 operating in vertical guide tracks on the supports A' and A² mounted within the casing. As is clear from Fig. 8, the wires extend through a vertical slot in the wall A² and adjacent vertical guide. Pivotally mounted on the rods 72, mounted in these walls, are a plurality of levers 68ª, 68ᵇ; 69ª, 69ᵇ; 70ª, 70ᵇ; 71ª, 71ᵇ. The upper ends of these levers are slotted, as is clear from Fig. 6, and are positioned to be engaged in pairs by the respective keys 61 to 64. In Fig. 8 the key 61 is shown in dotted position as engaging the adjacent ends of levers 71ª and 71ᵇ in the slots in the ends thereof. These levers are of different lengths, as is clear from Fig. 6, and are pivotally connected by a series of vertical links 73ª and 73ᵇ to the channel bars 20 of the harnesses. For example, lever 71ª is connected to the forwardmost harness bar 20 by means of the innermost link 73ª and link 71ᵇ is connected to the same harness bar 20 by means of the innermost link 73ᵇ. The next pair of links are connected to the ends of the harness next to the rear, and so on for the four harnesses. These connections are indicated in dotted lines in Fig. 3.

At 74 is indicated what may be termed handle bars which extend through the front wall of the machine (see Figs. 1, 2 and 3), and which are provided with a transverse finger bar. This pair of bars extends towards the rear of the machine and are pivotally mounted at 74' (see Figs. 4 and 8). The extension portions 74ª of these bars converge to the same point and are pivotally connected to a lever 75 (see Figs. 3 and 4), which in turn is pivotally mounted at 76 on a bracket extending from the wall A'. Lever 76 is pivotally connected at 77 to the carriage 66. It may be here noted, as shown in Figs. 9 and 10, that there are provided a pair of spring clips 66' mounted from the walls A' and A² and positioned to engage the upward extensions 66ª on the carriage 66 to hold it in raised position.

The handle bars 74 extend through slots on the front wall, one of which is shown in Fig. 14 at the bottom of which is an offset enlargement to form a shoulder in which the handle bars may be locked by a slight transverse movement to the right. Positioned in the path of the downward movement of the handle bars are a pair of levers 78 which are pivotally supported as shown, and pivotally connected to the vertically slidable locking bars 79. The outer ends of the levers 78 are connected to the casing by the springs 80 which hold them in the position shown. Flat springs 71 are provided and positioned so as to engage the handle bars and push them to the right into the notches in the slots, as is clear from Fig. 14. When the segments 46 (see Figs. 12 and 13) are rocked by the keys they engage a slidable bar 82 which slides forwardly to a position as shown in Fig. 13, where the lock bars 79 may move upwardly is back thereof. The release key 83 is connected to the bar and moves with it. This key or button extends through the front wall of the casing. When the segment moves a certain distance the springs 54 move past center so as to have a downward action on the ends of the levers ly in back thereof. The release key 83 is connected to the operated segments are pulled down against the pivot bar 47 and held in actuated position as shown in Fig. 13. The segments 46 may not be returned to normal position until the lock bars 79 are withdrawn from in back of the lock bar 82, after which it may be moved back to the position shown in Fig. 12 by release button 83.

At 84 (see Figs. 4, 5, 11 and 14) are a pair of slidable rods which extend through the front wall of the casing and are provided with spring members 85 which engage a fixed transverse rod 86 so as to hold the bars or rods 84 in actuated position. In the position shown in Figs. 4 and 5 for example, a latch 87, mounted on each of these arms is out of engagement with the lower end of the reed frame 22. When the bars 84 are pulled forward and held there by spring 85 the latches 87 engage the reed frames 22 and lock the reed against movement in that position. This is provided particularly on portable machines to hold the parts in place when the machine is transported. Additional locking mechanism also is operated by this bar to hold the other parts in normal position and consists of a connection between these bars 84 (see Fig. 8) and the U-shaped rods 72ᵇ so that when the bars 84 are pulled forward the rod 72ᵇ moves with it. This rod is provided with a series of pins 72ª, one for each of the harnesses which engage with downwardly projecting arm 20ª (see Fig. 6) when pulled forward as would be apparent from Fig. 6. When pins 72ª are pushed back out of the paths of the extension 20ª, the harnesses are free to move. This provides a locking mechanism to lock these parts when the device is being transported. The casing is provided with the drawers D to provide storage spaces.

In Figs. 25 to 29 inclusive are shown several forms of heddles in accordance with this invention. In Figs. 25 and 26 a heddle is shown constructed of a wire 100 bent into substantially U-shaped formation and provided with a nose 101 forming an eye 102 which is slotted at 103 through which the warp thread may be inserted. The upper portions of the arms 100 are interconnected by a web 104 of thin sheet metal or the like applied thereto as indicated in Fig. 26, to strengthen the structure. The lower ends of the arms 100 are provided with projections 105 adapted to fit in apertures in the U-shaped harness channel 20. The manner in which these heddles are inserted and removed is indicated clearly by the dotted lines in Fig. 25.

The heddle of Fig. 27 is made from a thin sheet of metal 106 which is formed with a pair of arms 107 at one end and provided with projections 108 to fit in the apertures of the harness channel. On the upper end of the heddle is a nose piece 109 formed from wire as shown, and secured thereto by soldering, welding, clipping and the like. The nose piece forms an eye and is slotted as in the previous case.

The heddle of Fig. 28 is entirely made of wire. It comprises a twisted portion 110 terminating at one end in the nose piece 111 similar to those previously described, and terminating at the other end in a pair of arms 112, which are provided with projections 113 as before. The heddle of Fig. 29 is entirely made of a thin strip of metal 114, which is cut away at 115 to form the slotted eye as before. The other end is provided with arms 116 having projections 117 by means of which it may be mounted in a properly shaped harness bar. These heddle constructions represent an important construction in that they are inexpensive, light in weight, and adapted to quick insertion in and removal from the harness bar. Their nose pieces are provided with eyelets which are slotted so that the warp threads may be inserted in and withdrawn therefrom by passage through the slots, eliminating the necessity for threading the warp threads therethrough. This construction facilitates the insertion and removal of the warp threads during the weaving operations when desired to correct errors or to effect replacement of heddles when necessary, or to change the pattern to be woven.

In Figs. 30 and 31 are shown a modified form of spacer or rod in which the dent-tines are pivotally mounted on their support so that when the detachable cap or cover piece is removed they may be swung horizontally until the warp threads are threaded, after which they may again be swung up between the warp threads and the cover piece attached. Thus, as shown in these figures the support 17¹ is in the form of a round rod and the dent-tines 17ʰ are formed with a circular aperture so that they may be pivotally mounted on the rod or support 17¹. These dent-tines may, for example, be formed of metal by stamping them out so as to have the form clearly shown in Fig. 1. Encircling the aperture is a rim or bead 17ʲ which acts to increase the bearing surface of the dent-tines on the support 17¹, and to provide means for spacing them. The upper ends may likewise be curled or bent over as shown to hold the dent-tines in spaced parallel relation. The frictional engagement of the dent-tines on the support 17¹ is such as to hold them in any position to which they are moved. They are prevented from crowding or becoming displaced longitudinally along the support by reason of the spacer arms 17ʲ. As before, the removable cap or cover piece 17 fits down over the upper ends of the dent-tines and is substantially circular in cross-section and longitudinally slotted as shown. This member may be made of any suitable material such as spring metal, and the free edges are inwardly curved to facilitate the application thereof and removal from the dent-tines.

The operation of the mechanism will now be described in sufficient detail that one skilled in the art will understand the purpose and function of the elements of the machine. The spools are provided with the necessary number of warp threads and locked on the shaft 4. The individual threads are placed around the guide rod 16, between the dent-tines 17' of the spacer, into the slotted eyelets of the heddles, through the dent-tines 25 of the reed, around the guide bar 33, and fastened to the cloth take-up shaft 34. These operations are facilitated by reason of the construction of the spacer, reed and heddles, eliminating the tedious threading of the warp threads therethrough, as is common practice, today. The heddles may be placed in the harnesses in accordance with any predetermined pattern, as will be apparent to those skilled in the art. The detachable heddles makes it possible to change the design of the pattern at any time by rearranging the heddles, which is possible by reason of the fact that the warp threads can be removed therefrom through the slotted eyes. Those skilled in the art will understand the manner in which the warp threads are successively snapped into the successive heddles to predetermine the design it is desired to weave. When the machine is fully threaded the loom is ready for weaving. As the heddles are placed in the harness bars, and as warp threads are placed in the heddles, the machine provides a constant, visual means of checking the accuracy of the work by ready comparison with the weaver's threading chart.

The general operations of the machine to effect weaving consist in pushing down those keys of the group 40 to 45 inclusive required in accordance with the design being reproduced. The keys 40 and 45 are known as the "tabby" keys which are operated in producing that well known type of fabric. By reason of the construction employed the tie-up between the different rollers can be varied between what is known as the universal tie-up and the normal or ordinary tie-up, as those skilled in the art will appreciate. The small locking spring 46ᵃ may be snapped off so that one of the pair of levers, say 48ᵇ is disconnected from its associated segment 46. This lever is permitted to rest against shaft 47 while the locking spring 46ᵃ is replaced. When this procedure is completed for levers 48ᶜ, 48ᵈ (on key 43) and 49ᵈ (on key 44), the four keys 41, 42, 43 and 44 are connected to only one roller, that is rollers 53, 52, 51 and 50 respectively instead of the two rollers each as in the tie-up illustrated in Fig. 11. This simple change permits the use of a very much wider range of patterns on a single loom than is possible with like ease on looms commonly employed today.

The depression of any of the keys, as for example key 43, will cause rotation of its associated segments 46 on the shaft 47 to the position shown in Fig. 13, in which position it will be held by the springs 54. The operation of this segment will operate the levers 48ᵈ and 49ᵈ connected thereto to rotate the rollers 50 and 51 to tension the springs 55 connected thereto. This will move these rollers to a position corresponding to the position of roller 51 in Fig. 13. This movement of these levers will pull the wires 58 and 59 forwardly being connected to these rollers (see Fig. 11). As shown in Fig. 8, the forward movement of levers 58 and 59 will pull forward the keys 63 and 64 against the resistance of springs 65 connected thereto. These keys will interconnect with the adjacent ends of levers 68ᵃ, 68ᵇ, 69ᵃ and 69ᵇ. The handle bars 74 are then depressed and when they reach the bottom of the slots in the front wall of the casing they will be forced into the notches by the flat springs 81, and they will remain there. At the same time the lock bar 79 moves up and back of the bar 82 which was moved forward when the segment 46 was rotated. This locks the operated key 43 and the mechanism connected thereto in operated position. The depression of the handle bars will also cause the carriage 66 to move downwardly as is clear from Figs. 17 and 18. The downward movement of the carriage 66 will cause the operation of the levers connected thereto by the keys 63 and 64. The operation of these levers will cause, as is clear from Figs. 6, 8 and 9, the two rearmost harnesses to move upwardly to the position shown in Fig. 18. Those warp threads which are threaded through the heddles mounted on the two harnesses which were raised, will be raised as is clear from Fig. 18, forming the shed SH. Of course, the particular harnesses, or all of them which will be raised, will depend upon which keys have been operated, and those warp threads will be raised which are threaded through raised heddles. As is clear from Fig. 18, the reed 24 is moved to the position shown prior to the formation of the shed. The shuttle with its thread is then passed or thrown through the shed in accordance with common practice. The handle bars 74 are then released from the notches by a slight sidewise movement and returned to normal position. This returns the carriage 66 to its raised position and drops the harnesses and heddles to normal position. The return of the handle bars to normal position withdraws the locking bars 79 and the depressed keys are then returned to normal position by pressing inwardly the release button 83 which moves the bar 82 back to the position shown in Fig. 12 and brings the segments and rollers back to normal position. The woven cloth is then beaten with the reed, as in all weaving, and the reed returned to its position in Fig. 18. This represents the coimplete operation which is repeated continuously as the fabric is woven. The design of the woven fabric of course is determined by which keys are depressed, which in turn is indicated by a weaving chart as is commonly employed.

The procedure of weaving is relatively simple as indicated by the following recapitulation. The first step is to push down those keys as indicated by the weaving chart. The handle bar is then pushed down so that the shed is formed. The shuttle is thrown as in all weaving. The handle bar is released, the keys returned by the push button, and the fabric is beaten with the reed, as in all weaving.

As the fabric is woven, from time to time, the finished product is rolled up on the cloth spindle 34 by turning the handle 34$^b$.

As will be apparent to those skilled in the art, the specific forms of structure illustrated in the drawings for aid in disclosing the invention may easily be varied without departure from the novel subject matter of the invention. I do not, therefore, desire to be strictly limited to the disclosure as given for purposes of illustration, but rather to the scope of the appended claims.

What is claimed is:

1. In a loom a harness including a channel shaped member having sockets thereon and a plurality of heddles removably mounted thereon each having a pair of spring legs and means for engaging in said sockets.

2. In a loom a harness including a channel shaped member having sockets thereon and a plurality of heddles removably mounted thereon each having a pair of spring legs, and means for engaging in said sockets, the upper end of the heddle having an eye portion and a vertically extending, substantially closed slot communicating therewith.

3. In a loom, a heddle having an elongated body portion terminating at one end in a warp thread receiving eye, said eye having a short open slot at the outer end thereof narrower than the thread it is to receive.

4. In a loom, a vertical heddle having a slotted thread receiving eye at the upper end and forming the terminal thereof, said slot being open and extending vertically.

5. In a loom, a heddle having a slotted eye at one end and a pair of spring legs each having a projection for releasably locking them on a harness bar.

6. In a loom, a heddle having a slotted eye at one end and a pair of spring legs each having a pair of spaced projections for locking them on a harness bar.

RICHARDSON ROWNTREE.
RICHARDSON H. ROWNTREE.